March 11, 1952     E. P. ANSTETT     2,588,951
LICENSE PLATE FASTENER
Filed May 28, 1945
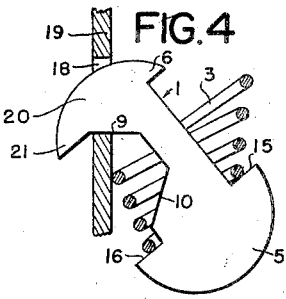
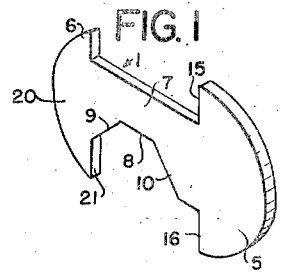
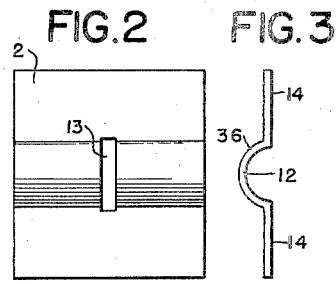
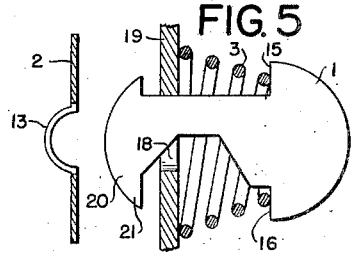
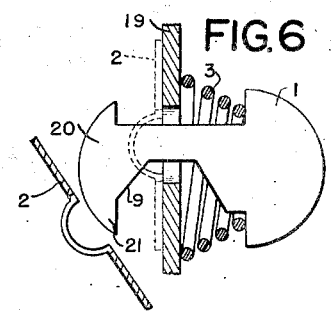
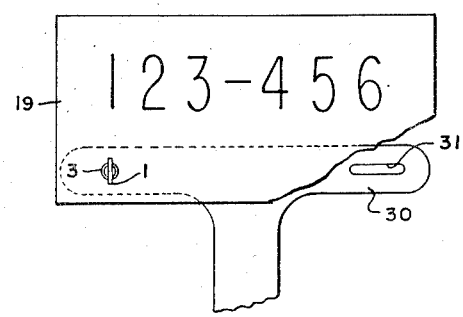
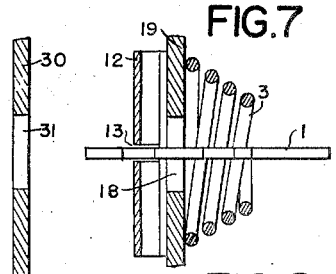
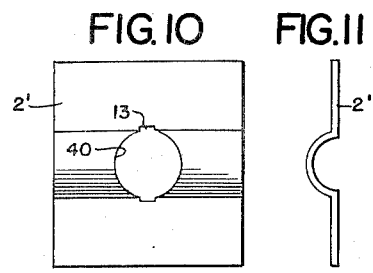
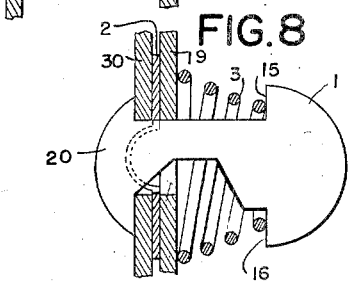
INVENTOR.
EDGAR P. ANSTETT
BY *Morris Spector*
ATTORNEY Patented Mar. 11, 1952

2,588,951

UNITED STATES PATENT OFFICE 2,588,951

LICENSE PLATE FASTENER

Edgar P. Anstett, Chicago, Ill.

Application May 28, 1945, Serial No. 596,277

2 Claims. (Cl. 85—5)

This invention relates to connectors for use in connecting or securing an automobile license plate to the conventional license plate-holding bracket on an automobile.

License plates are generally mounted on the bracket by means of two or more screws that extend through holes in the license plate and holes in the bracket, and are held in place by nuts threaded on the ends of the screws. The license plate fastening means is exposed to weather for approximately a year, during which time the threads on the screws rust and it is exceedingly difficult and sometimes impossible to remove the nuts from the screws when it is necessary to replace the license plate. It is one of the objects of the present invention to provide a license plate fastening means which is devoid of cooperating screw threads so that when it is desired to remove a license plate which has been in position for a year, the average automobile owner can manipulate the license plate securing means for releasing the old license plate.

It is a further object of the present invention to provide license plate securing means that can be easily and quickly positioned to secure an automobile license plate to the usual plate-receiving bracket and which will securely hold the license plate in place. It is a still further object of the present invention to provide license plate-holding means of the type which is not likely to become loose and which cannot be readily removed by children or by petty vandals, but of such construction as nevertheless to permit removal by an adult with the use of simple tools.

The attainment of the above and further objects of the present invention will be apparent from the following specification taken in conjunction with the accompanying drawing forming a part thereof.

In the drawing:

Figure 1 is a perspective view of a key used in connection with the present invention;

Figure 2 is a front view of a connector lug;

Figure 3 is an end view of the connector lug;

Figures 4, 5, 6, 7 and 8 are sectional views illustrating the successive positions of the connector during the operation of connecting an automobile license plate to a standard license plate holder;

Figure 9 is a front view of the license plate and assembled holder with parts thereof broken away; and Figures 10 and 11 are, respectively, front and end views of a modified form of connector plate.

The license plate holder of the present invention comprises three parts, namely, a key 1, a connector plate 2 and a conical helical spring 3. The key and connector plate are sheet metal stampings. The key 1 of the present invention comprises a handle portion 5, a locking portion 6 and a shank 7 joining the two. The shank 7 is of reduced width at the center 8 thereof and of increasing width along the lines 9 and 10 to the portions 6 and 5, respectively.

The connector plate 2 is a sheet metal stamping having a channeled depression 12 formed in one face thereof and having a slot 13 stamped therethrough across the channel 12 and extending slightly into the wings 14—14 of the connector plate.

In order to assemble the holder and use it to secure a license plate to the license plate mounting means a conical helical spring 3 is first slipped over the end of the key 1. The spring embraces the shank 7, and the small diameter end of the spring bears against the lugs or projections 15—16 of the handle portion of the key. Thereafter the locking portion 6 of the key is inserted through a circular hole 18 of a license plate 19. The circular hole is of a diameter appreciably less than the diameter of the circle about which the arc 20 is centered, but is slightly greater than the radius of that circular arc. In order to get the portion 6 of the key through the hole 18 the tip 21 of the key is first inserted through the hole 18 and then the entire portion 6 is moved from the position illustrated in Figure 4 to the position illustrated in Figure 5. During this operation the spring 3 is compressed, and also the key 1 is slid to the left of the position illustrated in Figure 4, sliding so that the edge 9 of the key slides in the circular opening 18 of the license plate holder. The spring 3 is on the front side of the license plate 19. When the key 1 is positioned in the license plate 19 in the manner illustrated in Figure 5 the connector plate 2 is brought into position with the slot 13 thereof opposite the portion 6 of the key. The key is pressed towards the license plate to compress the spring 3, as illustrated in Figure 6, and then the connector plate 2 is positioned between the back of the license plate and the locking portion 6 of the key, as illustrated in dotted lines in Figure 6. To bring this about the connector plate is first turned at an angle, as indicated in Figure 6, and the edge 21 of the key is passed through the slot 13 of the connector plate. Thereafter the connector plate is turned until it assumes a position with the wings 14—14 thereof lying flat against the back surface of the license plate.

In this position the connector plate 2 has now been secured to the license plate and the operator is ready to secure the license plate to its usual bracket support. The usual license plate support of an automobile consists of a flat bracket, indicated diagrammatically at 30, said bracket having two spaced oval-shaped holes 31 therein at opposite ends thereof. Each of these holes is of a width approximately equal to the diameter of the hole 18 in the license plate and of a length many times the diameter of the hole 18. License plate fastening means such as shown in Figure 6 are secured to each of the two (or four) fastening holes of a license plate. The license plate 19 is then brought against the plate-holding bracket 30 so that the part 6 of the license plate holder enters into the horizontal slot 31. At this time the flange 12 extends across the slot 31. The handle portion 5 of the key 1 is then pushed towards the license plate, compressing the spring 3 and forcing the part 6 of the license plate through the oval hole 31 in the bracket 30 and beyond the back of the bracket. While the key is thus held in position, with the spring 3 under compression, the key is turned through an angle of 90°. As it is turned the connector plate 2 turns with it. The flange 12 ultimately reaches a position parallel with the length of the slot 31. As soon as this position is reached the pressure of the spring 13 acting upon the license plate 19 and the wings 14—14 of the connector plate forces the connector plate into the slot 31. The flange 12 is of a width, at the back of the connector plate, sufficient to fit snugly into the opening 31. As soon as the flange 12 reaches a position with its longitudinal axis parallel with the longitudinal axis of the oval opening 31, and enters that opening, it engages the slot 31 and prevents further turning of the connector plate and further turning of the key 1. At this time the key is in a position with the license plate-engaging portion 6 extending across the slot 31. On manual release of the key the spring 3 brings the key back to the position illustrated in Figure 8 where the flanges of the key engage the back surface of the license plate-holding bracket 30 immediately above and below the slot 31, thus keying the license plate 19 to the holder.

Removal of the license plate 19 is rendered difficult, but not impossible. This prevents theft of the license plate but does not prevent an owner, by the use of suitable simple tools, from removing the license plate. This may be accomplished by merely clipping the key 1 at the shank 7. It may also be accomplished by inserting a tool at the back of the bracket 30 with said tool bearing against the back of the channel 12 and forcing that channel forward an amount exceeding the thickness of the bracket 30, so that the channel 12 clears the bracket. While this is being done the license plate 19 is also being forced forward, and the spring 3 is being compressed. When the channel 12 of the connector plate 2 has been thus forced out of the opening 31 and while it is manually held out of that opening by the tool at the back of the bracket 30, the key 1 is turned until its plane is parallel with the longitudinal axis of the slot 31, at which time the portion 6 of the key may be withdrawn from the slot 31.

In Figures 10 and 11 I have shown a modified construction of a connector plate, indicated by the reference numeral 2'. The only difference of this connector plate over that of Figure 2 is that the channel 12 has a circular slot 40 therethrough which is of a diameter slightly in excess of the width of the narrow portion 8 of the shank 7 of the connector key. When that connector is positioned as illustrated in Figure 8, it is possible to turn the connector key through an angle of 90°, even though the connector plate remains stationary. Such 90° turn of the key 1 then permits removal of the license plate holder from the bracket 30. This construction permits easier removal of the license plate from the bracket 30. This is not entirely an advantage because the easy removal of the license plate holder while appreciated by the owner when changing license plates, also lends itself more easily to theft of the license plate.

In compliance with the requirements of the patent statutes I have here shown and described a preferred embodiment of my invention. It is, however, to be understood that the invention is not limited to the precise construction here shown, the same being merely illustrative of the principles of the invention. What is considered new and desired to be secured by Letters Patent is:

1. A license plate fastener comprising a key, a connector plate and a helical spring, said key having a non-circular shank portion terminating at one end in a head which is adapted to be inserted through a bolt hole in an automobile license plate, said connector plate having an opening therethrough through which said head extends, the opening being non-circular and of a minimum width less than the maximum width of the portion of the shank that extends through the opening so that the shank is non-rotatable in the opening said connector plate having rearwardly extending projecting means adapted to enter a fastening slot in an automobile license plate holding bracket and fit therein to hold the connector plate against turning, the head of the key being of a length substantially less than the length of the slot in the bracket and more than the width thereof, the key head being insertable into and through the bracket slot and upon turning of the shank the key head is moved out of alignment with the bracket slot to a position across the bracket slot, the shank having another head at the opposite end thereof, and the spring surrounding the shank and bearing against said other head.

2. A license plate fastener comprising a stamped sheet metal key, a stamped sheet metal connector plate and a helical spring, said key having a shank portion terminating at one end in a head which is adapted to be inserted through a bolt hole in an automobile license plate, said head being of a length in excess of the diameter of the bolt hole through which it is to be inserted and of a width less than such diameter, said connector plate having a slot therethrough through which said head extends, the slot being of a width less than that of the shank so that when the shank extends through the slot a turning of the shank will result in turning of the connector plate, said connector plate having rearwardly extending projecting means adapted to enter a fastening slot in an automobile license plate holding bracket and fit therein to hold the connector plate and the key against turning, the head of the key being of a length substantially less than the length of the slot in the bracket and more than the width thereof, the key head being insertable into and through the bracket slot while the rearwardly extending projecting means on the connector plate is out of alignment with the slot in the bracket and upon turning of the shank the key head is moved out of alignment with the bracket slot to a position across the bracket slot and the projecting means on the connector plate is brought into alignment with and enters the bracket slot, whereupon the connector plate is held against further turning and holds the key against turning, the shank having another head at the opposite end thereof, and the spring surrounding the shank and bearing against said other head.

EDGAR P. ANSTETT.

REFERENCES CITED

The following references are of record in the file of this patent:

UNITED STATES PATENTS

| Number | Name | Date |
|---|---|---|
| 1,515,518 | Owens | Nov. 11, 1924 |
| 1,540,735 | Kroff | June 2, 1925 |
| 1,586,904 | Kuhn | June 1, 1926 |
| 1,666,783 | Kries | Apr. 17, 1928 |
| 1,772,835 | Jurad | Aug. 12, 1930 |
| 1,803,431 | Hill | May 5, 1931 |
| 2,011,472 | Chobert | May 24, 1934 |
| 2,033,875 | Brantley | Mar. 10, 1936 |
| 2,119,764 | Young | June 7, 1938 |
| 2,133,555 | Mayfield | Oct. 18, 1938 |
| 2,216,385 | Chobert | Oct. 1, 1940 |
| 2,379,752 | Schultz | July 3, 1945 |

FOREIGN PATENTS

| Number | Country | Date |
|---|---|---|
| 15,005 | Great Britain | of 1912 |